Jan. 25, 1927.

L. MELANOWSKI 1,615,397

POWER TRANSMITTING MECHANISM

Filed July 24, 1922    4 Sheets-Sheet 4

Inventor
Leo Melanowski

By Lloyd L. Evans
Attorney

Patented Jan. 25, 1927.

1,615,397

UNITED STATES PATENT OFFICE.

LEO MELANOWSKI, OF CLEVELAND, OHIO, ASSIGNOR TO EDWARD DURELL, OF FRANKFORT, NEW YORK.

POWER-TRANSMITTING MECHANISM.

Application filed July 24, 1922. Serial No. 576,940.

This invention relates to motor vehicles and more particularly to the power transmitting mechanism therefor.

One object of the invention is to provide an improved power transmitting mechanism capable of transmitting the power of the engine to the drive wheel or wheels of the vehicle effectively and economically.

Another object of the invention is to provide a power transmitting mechanism in which the proper speed reduction may be secured between the propeller shaft and the traction wheel or wheels to propel the vehicle positively and with minimum friction losses.

Another object of the invention is to simplify in construction and arrangement the elements constituting the power transmitting mechanism.

Another object of the invention is to provide mechanism of this character in which the differential elements and proper speed reducing elements are correlated and combined to transmit the power of the propeller shaft in a relatively efficient manner.

A further object of the invention is to so construct and correlate the elements constituting differential and speed reducing elements and the housing members therefor that adjustments, assembly and disassembly of such elements and members may be readily made.

Another object of the invention is to provide novel means for supporting the elements of the power transmitting mechanism, whereby all twisting, flexing and distortion of the driven axles are prevented and the gear elements are at all times maintained in proper cooperative relationship with each other.

Another object of the invention is to provide a novel means for obtaining three distinct reductions in speed between the propeller shaft and the driven axle sections for the wheels of the vehicle. whereby a relatively large speed reduction may be obtained.

Other objects of the invention will be apparent to those skilled in the art to which my invention relates from the following description and the accompanying drawings.

For the purpose of illustration I have in the accompanying drawings shown and herein described one form of apparatus embodying my invention.

In the accompanying drawings forming a part of this specification,

Figure 1:
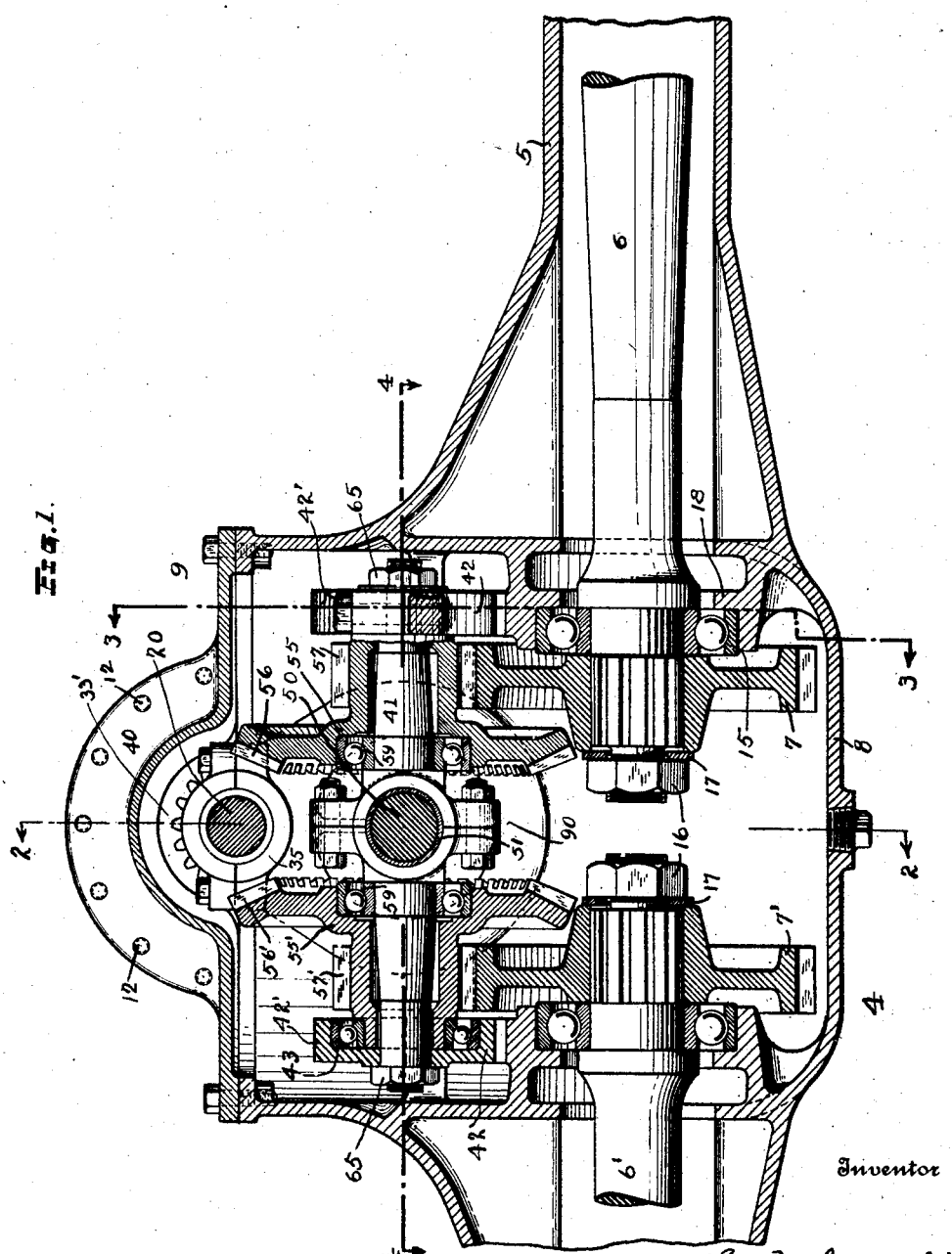
Figure 1 is a vertical section taken on line 1—1 of Fig. 4 of the rear axle mechanism embodying my invention.
Figure 2:
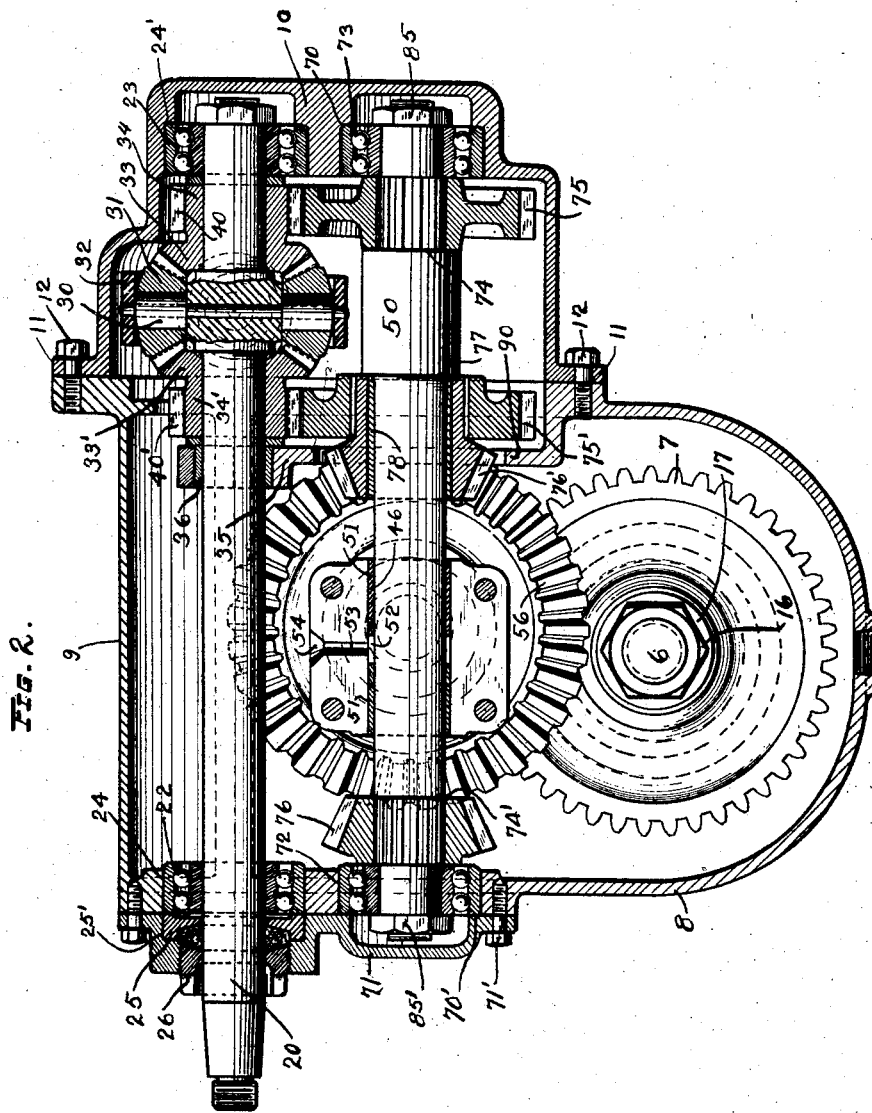
Fig. 2 is a vertical section taken on line 2—2 of Fig. 1.
Figure 3:
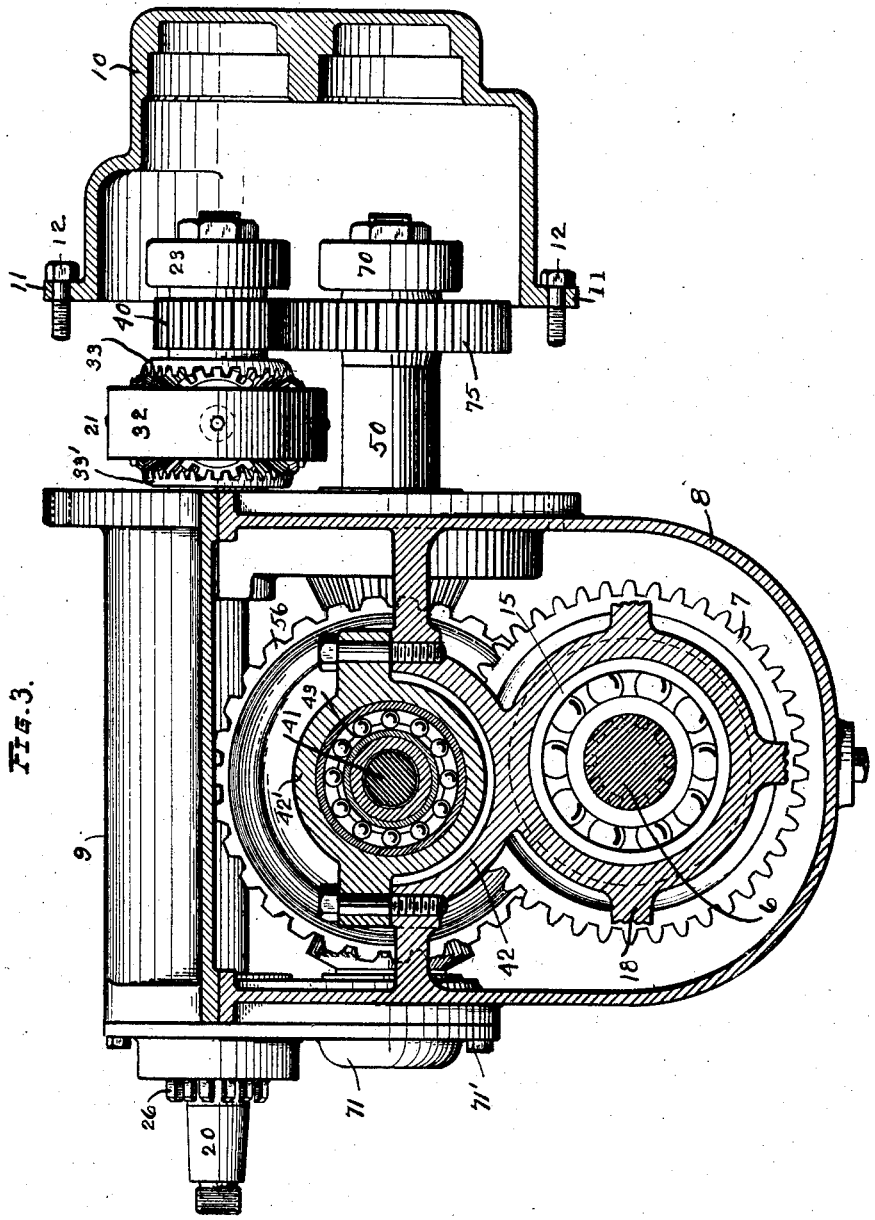
Fig. 3 is a vertical section taken on line 3—3 of Fig. 1.

In the drawings, 4 indicates as an entirety that axle, preferably the rear axle, of a vehicle which may be propelled by a propeller shaft by suitable motive power, for example an internal combustion motor (not shown). The elements for transmitting power from the propeller shaft to the rear axle are preferably constructed and correlated to permit the axis of the driving element connected to the rear end of the propeller shaft to be arranged when the chassis is disposed in normal position relative to the axes of the vehicle axles substantially in axial alinement with the crank shaft of the motor, whereby the latter said element and the intermediate element or elements constituting the propeller shaft may transmit the power of the motor with minimum friction losses. The rear axle 4 preferably includes a housing 8 and a pair of tubular members 5. The tubular members 5 enclose driven axle sections 6, 6' which may be connected in any suitable manner (not shown) to the rear wheels. At their inner ends the tubular members 5 are flared or enlarged to form the bottom and parts of the sides and ends of the housing member 8. A removable cover 9 is secured by any suitable fastening means to the housing 8. Secured in any suitable manner to the rear of the cover 9 and housing 8 is a removable closure member 10 enclosing the differential mechanism and shaft 50 hereinafter described. This closure member 10 may be flanged as at 11 to receive bolts 12 which are threaded into apertures in the cover and housing.

Secured to the driven axle sections 6, 6', in any desired manner, as by keying, are spur gears 7, 7'. Preferably the axle sections are reduced at their inner ends to form shoulders against which the bearings 15 and spur gears, 7, 7' are clamped by the nuts 16 engaging the screw threads on the free ends of the axle sections. Suitable washers 17 may be interposed between the nuts and the gears. The bearings 15 are suitably mounted in annular bearing supports 18 projecting from the side wall of the housing 8.

Of the power transmitting and speed reducing mechanism, 20 indicates a shaft section which is connected to and is driven by the vehicle propeller shaft, (not shown) and constitutes an element of the differential mechanism 21. At its front or outer end the shaft 20 is adapted to be connected in any well known manner, but preferably by a universal joint, to the rear end of the propeller shaft. The rear end of the shaft section 20 extends to the rear of the housing. The bearing 22 is suitably mounted in the opening 24 of the housing and the bearing 23 is supported in recess 24' in the closure member 10. A suitable spacer 25 to receive packing is mounted adjacent the opening 24 of the housing 8 and in a recess 25' in closure 71. A closure nut 26 receives the shaft section 20 and is threaded into the closure member 71. The nut 26 and spacer 25 have their opposing faces recessed to receive suitable packing to prevent leakage of lubricant from the housing along the shaft 20.

Preferably integral with the shaft 20 are a plurality of studs 30 carrying bevel pinions 31 loosely mounted thereon, but held in position by heads which may comprise an anular ring 32. 33, 33' indicate differential bevel gears having hubs 34, 34' loosely mounted in the shaft section 20. The gears 33, 33' mesh with the pinions 31 and are rotated thereby together or relatively to each other in the usual manner. The hub 34 is of sufficient length to serve as an abutment for the inner race of the bearing 23, a suitable spacer being interposed. The hub 34' bears against the support 35 carried by the wall of the housing, a suitable bearing sleeve 36 being interposed between such support and the shaft 20 and between the hub and support. The support 35 and the closure member 10 when assembled in position thereby receive the thrust from the differential bevel gears 33, 33'. The hubs are provided with pinions 40, 40' preferably of the spur type, the purpose of which will be later described.

41 indicates a supporting member carried by supports 42 suitably recessed to receive bearings 43. The supports 42 are carried by an upper extension of the support 18 which may be formed as an integral part of the housing. Mounted on and removably secured by bolts to the supports 42 are bearing supports 42' to hold the bearings 43 and consequently the member 41 in place. By removing the bolts the member 41 and supports 42' may easily be taken out of place.

The opposite ends of the supporting member 41 are offset from each other and form axle members 45, 45', the purpose of which will be later described. The central portion 44 of the member 41 is formed with an opening 46 in which the rotatable shaft section 50 is mounted. The opening 46 may be provided with suitable bearing sleeves 51 spaced apart to provide an opening 52 for the reception of lubricant from the duct 53 having a flared opening 54 for the admission of lubricant.

Mounted on the axle sections 45, 45' are similar gear elements 55, 55' comprising bevel gears 56, 56' having hubs 56ª, 56ª' loosely fitting the axles; and mounted thereon, and preferably integral therewith, are spur pinions 57, 57', the purpose of which is hereinafter described. Gears 56, 56' have recessed portions 58 to receive and engage bearings 59, the other side of said bearings being rigidly held against the shoulders 60 of the central portion 44 of the member 41. Each hub sleeve 56ª is externally reduced to form a hub shoulder 61 to engage the inner race of a bearing 43, the bearing 43 being clamped between the shoulder 61 and the shoulder 64 of the support 42. The outer ends of the member 41 extend through openings in the supports 42 and are threaded to receive nuts 65. By tightening these nuts the bearings and gears are suitably positioned with respect to the member 41.

The shaft 50 is carried by bearings 70, 70' mounted in an opening in the forward portion of the housing 8 and in seats in the closure member 10 respectively. The closure member 71 is secured to the forward portion of the housing 8 by any suitable removable fastening means and form a shoulder with opening 72 against which the bearing 70 is mounted. The closure 10 is suitably recessed and shouldered at 73 to receive and engage the bearing 70 at the other end of the rotatable shaft 50. The shaft 50 is shouldered on one end at 74 and at the other end at 74' and carries against these shoulders spur gear 75 and bevel pinions 76 respectively, both suitably keyed or otherwise secured thereto in any known way to turn therewith. The shaft 50 is also shouldered at 77 and carries bevel pinion 76' rotatably mounted thereon and abutting against said shoulder, there being a suitable bearing sleeve 78 interposed between the pinion and shaft. Superposed upon the hub 79 of the bevel pinion 76' is mounted a spur gear 75' to turn therewith. The nut 85 is threaded upon a reduced end of the shaft 50 to engage the bearing 73 and hold it and the spur gear 75 tightly against the shouldered portion 74. Similarly the nut 85' engages the bearing 72 to hold it and the bevel pinion 76 in proper position.

The shaft 50 as a whole may be properly located with respect to the housing by a tightening of bolts 12 of closure member 10 and bolts 71' of closure 71, both closure members being shouldered to engage the bearings 73, 72 respectively as above set forth.

The assembly of the various parts of my power transmitting mechanism may be accomplished in the following manner. The bearings 15 and spur gears 7, 7' are secured on the inner ends of the driven axle sections 6, 6' by the nuts 16, the inner ends of the axle sections having been previously inserted longitudinally through the openings in the support 18. The supporting member 41 with the rotatable shaft 50 therethrough, together with all the gears and bearings therefor, may be assembled outside of the housing and put into place with the bearing supports 42' resting upon the supports 42 and the bearings 70' engaging the opening 72 in the housing 8. The bearing support 42' can then be bolted to the support 42 thus properly holding the member 41. The driving shaft 20 together with the differential and bearings therefor may be inserted so that the front end of the shaft 20 projects through the opening 24 of the casing. The closure members 9, 10 and 71 may then be bolted in place and the mechanism is assembled for operation.

Power is transmitted from the driving shaft 20 to the differential mechanism, the differential bevel gears 33, 33' respectively rotating on the driving shaft 20. The spur pinions 40, 40' are mounted to turn with the hubs of the differential bevel gears and are therefore driven by the differential mechanism. The spur gears 75, 75' are engaged and driven by the pinions 40, 40' respectively. The spur gear 75 drives the bevel pinion 76, both being keyed to the shaft 50 while the spur gear 75' drives directly the bevel pinion 76', they being mounted to rotate together upon the shaft 50.

Mounted upon the offset ends of the rigid shaft member 41 are bevel gears 55, 55' which are driven by the bevel pinions 76, 76' respectively. As the ends of the shaft 41 are offset the bevel gears 56, 56' clear and do not interfere with the pinions 76', 76 respectively. The bevel gears 55, 55' have secured to their hubs 56ᵃ, 56ᵃ' to rotate therewith the spur pinions 57, 57' respectively, and these in turn drive the spur gears 7, 7' secured to the axle sections.

The support 35, previously mentioned, is carried by the substantially vertical wall member 35' which is preferably integral with the housing. The member 35' is apertured to receive the driven shaft 50 with its bevel pinion 76'. The aperture is located above the connection of the wall 35 to the housing proper, so that the annular flange 90 cooperates with the closure 10 to form a container which will hold lubricant up to the height of the flange 90. The gears 75, 75' dip into the lubricant held by this container and easily carry it to the pinions 40, 40' and differential mechanism.

The spur gears 7, 7' constantly rotate in lubricant held in the bottom of the housing member 8 and splash and carry the lubricant to the gears and pinions above. The lubricant also drips from the driving shaft 20 down to the central member 44 of the supporting member 41 and part of it is received in the flared end 54 of the duct 53 to lubricate the driven shaft 50 and its bearing.

It will thus be seen that the speed reduction is carried on in three stages through gears and pinions mounted on the driving shaft, the driven axle sections and on a rotating and fixed shaft, located in the same plane, beneath the driving shaft and above the driven axle sections. From the differential two trains of gears are operated, each of the corresponding elements being of the same size and free to rotate without interference from the others.

It will thus be noticed that I have provided a power transmitting mechanism which has relatively large road clearance in that the spur gears 7, 7' may obviously be relatively small in diameter due to their being a triple reduction in speed from the power transmitting shaft. Also the location of the differential mechanism being out of alinement with and to the rear of the central vertical plane through the driven axle sections permits the relative height of the differential mechanism with respect to the driven axle sections to be reduced.

These features of construction obviously permit a relatively smaller housing construction with large road clearance and with the tubular members 5 strongly reinforcing the housing, due to their permitting a relatively large area of connection with the housing and a relatively long taper therefrom to the normal size of the tube enclosing the driven axle sections.

The construction of power transmitting mechanism disclosed herein permits differential movement between the axle sections 6, 6' and provides for the transmission of power to the wheels with triple reduction in speed thereof relative to the speed of the propeller shaft and enables one to secure practically any desired reduction ratio varying from about 8 to 1 to about 18 to 1 in applying the principles exemplified in the construction herein shown and described. At the same time the size of the gears and pinions and also the bearings are relatively reduced from that in a double reduction axle.

It will also be noticed that the bearings for the power shaft and driven shaft 50 are all of uniform kind and size, thus simplifying the construction and reducing the number of different sized parts.

Figure 4:
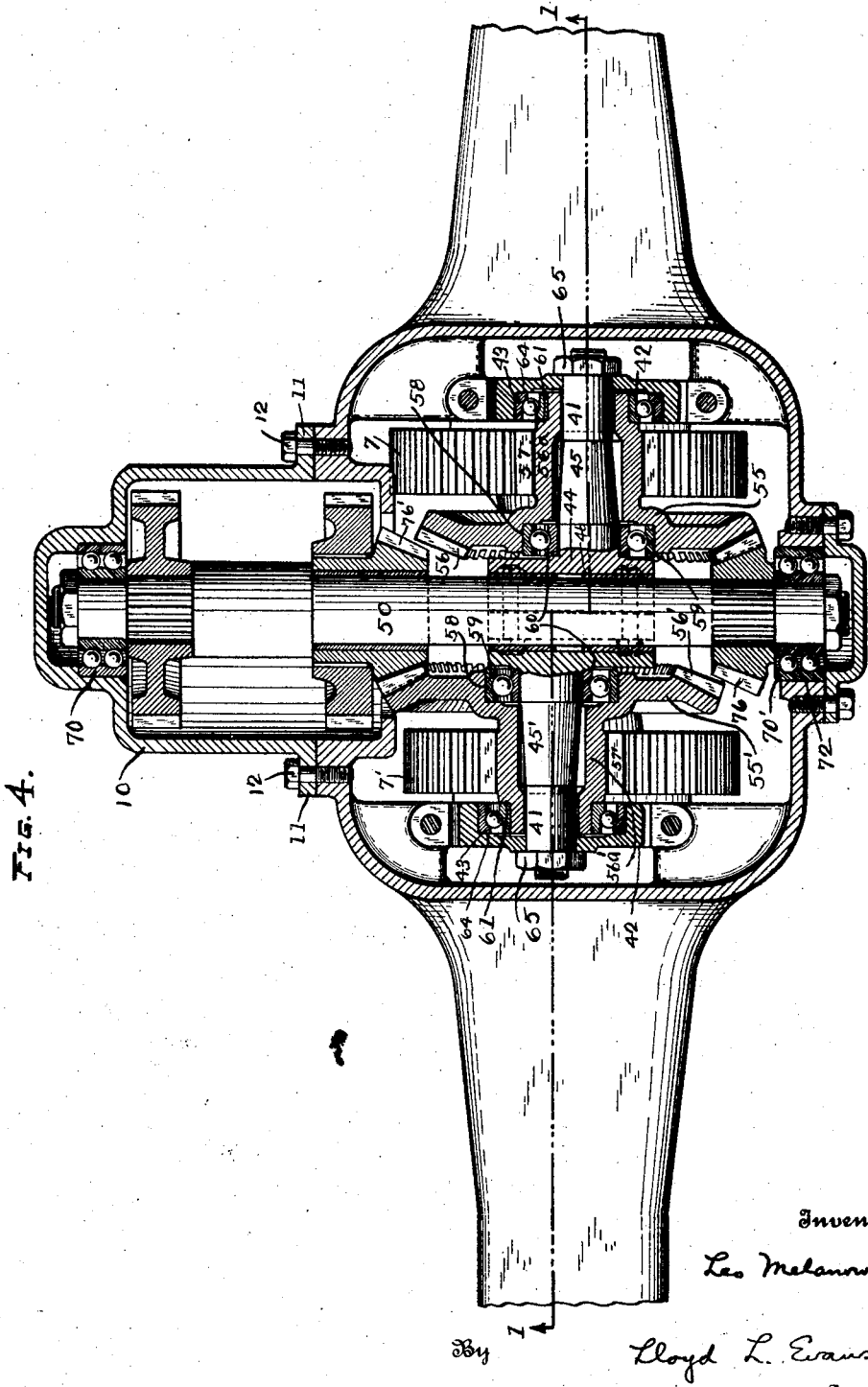
Fig. 4 is a horizontal section taken on line 4—4 of Fig. 1.

As shown in Figs. 1 and 4 the supporting or truss member 41 has offset ends forming oppositely extending shaft members so that the bevel gears 56 will not interfere and yet may be of the same size, and consequently permitting the transmission of power from each differential gear to the axle sections by the same number of elements and of the same size. This construction also permits the member 41 to be rigidly held in place so that it is always in alinement and cannot turn about a horizontal axis and interfere with the free rotation of the shaft 50.

It will also be seen that by having the bevel gears 56, 56' intermediate the spur gears, so that they rotate neither at the highest speed nor the lowest speed, is advantageous, for when bevel gears are used for relatively high speeds the teeth are limited in size and will consequently wear faster. Similarly when used in the last reduction to drive the axle sections directly, a relatively larger amount of power is transmitted causing heavy tooth pressure which is conductive to more rapid wear in bevel gears.

It will also be noticed that the supporting member 41 does not project through the sides of the housing with the consequent liability of permitting oil leakage. The closure members 10 and 71 may be tightly bolted in place to prevent such leakage, and when this is done the only projecting shaft of the axle housing is the driving shaft 20 for which means to tightly pack the same have been before described. Consequently oil leakage is prevented.

It will also be seen that the placing of the differential mechanism on the propeller shafts and in the rear of the axle sections permits the front end of the driving shaft 20 to be connected to the usual universal joint at a point relatively nearer the vertical plane of the axle sections than if the differential mechanism were located forwardly of the axle sections. Such reduction of the distance from the universal joint to the vertical plane through the axle sections greatly reduces the torque, thus eliminating stresses which would otherwise be transmitted to the entire speed reducing mechanism.

The construction disclosed enables me to procure a resistance to skidding or slipping of one of the wheels on the road when the traction of one wheel is greatly reduced as in thin mud, etc., such as has not been obtainable without the use of the so-called locking type differential mechanism. A possible explanation of this may be that such resistance to the spinning of one of the wheels on a slippery surface arises from the friction or inertia inherent in the three sets of reducing gears located between the differential mechanism and the wheels. In ordinary commercial constructions, even where there is a double reduction in speed, it is usually customary to have one of the reductions, such for example as a bevel gear reduction, ahead of the differential mechanism. Any speed reducing mechanism ahead of the differential would have no effect on the locking action, as the locking action is caused by a retarding effect between the differential mechanism and the wheels.

It will further be seen that with the construction herein disclosed the driving shaft is positioned a substantial distance above the plane of the axes of the driven axle sections, whereby said driving shaft section may be connected with the usual universal joint of the propeller shaft in a vehicle chassis, and yet the axis of such driving shaft section may be kept in substantially a horizontal plane and in alinement with the propeller shaft. This feature of construction enables my axle to be applied to shafts such as those designed for the worm drive and permits a substantially straight line drive.

It is also to be noted that with the construction herein disclosed and with the housing containing the usual amount of lubricant in the enlarged central chamber, only the relatively slow moving spur gears project downwardly sufficiently into the bottom portion of the chamber to dip into the lubricant. This is of advantage when the lubricant is of relatively high viscosity, as when starting, for the relatively small surface area of these gears and the relatively slow speed decreases the usual resistance or churning action occasioned by forcing relatively large surfaces of metal at relatively high speed thru the lubricant, as for example a revolving differential mechanism.

From the foregoing description it will be seen that my power transmitting mechanism is relatively simple, although providing for the driving of wheels with speed reduction in three stages efficiently under all conditions in use, and that the elements thereof may be relatively simple to insure their cheap and easy manufacture, as well as ample strength and durability thereof.

It will also be seen that by placing the differential mechanism on the propeller shaft the differential bevel gears and pinions can be relatively small and yet be relatively much stronger for the transmission of power at such location than when they are placed to directly drive the driven axle sections, for in the latter position they are customarily made as small as is possible for safety in transmitting the necessary power but even this necessitates their being relatively large.

It may be noted that my invention is highly advantageous and very adaptable to electrically driven motor vehicles wherein relatively large reductions in speed from the driving shaft to the traction wheel are desirable.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

Having described my invention, what I claim is:

1. The combination in a driving axle of a housing, a driving shaft, a differential mechanism mounted thereon and actuated thereby, driven axle sections arranged end to end in said housing and having driving gears secured to their inner ends and speed reducing gearing between said differential mechanism and driving gears, said differential mechanism being disposed back of said housing for said driven axle sections and enclosed by a removable cover plate whereby said differential is readily accessible.

2. The combination with a pair of driven axle sections of a driving shaft section, a differential mechanism mounted thereon and rearwardly of said driven axle sections, a rotatable shaft carrying fixed and idle gears and pinions, said fixed gear and pinion being operated by one side of said differential and said idle gear and pinion being operated by the other side of said differential, and speed reducing gearing between said fixed and idle gears and said driven axle sections.

3. The combination with a pair of driven axle sections of a driving shaft section, differential mechanism operated thereby, a fixed shaft carrying bevel gears in parallel planes but with their axes out of alinement relative to each other, a rotatable shaft at an angle to said fixed shaft and driven by one side of the differential through a pinion fixed to said rotatable shaft, and an idle pinion movable on said rotatable shaft and driven by the other side of the differential, said pinions operating the unalined gears, and speed reducing gearing between said last-named gears and the driven axle sections.

4. The combination with a pair of driven axle sections, of a driving shaft section, a differential mechanism operated by said driving shaft, a rotatable shaft disposed beneath said driving shaft and having a gear mounted to rotate therewith, whereby it may be driven by one side of the differential, said rotatable shaft carrying a loosely mounted gear operated by the other side of said differential, and reduction gearing between the gears on said rotatable shaft and driven axle sections.

5. The combination in a driving axle of a housing, a pair of driven axle sections arranged therein, of a driving shaft section disposed in said housing, at an angle thereto, a differential mechanism out of alinement with and rearwardly of said driven axle sections, a fixed member having offset shaft sections carrying bevel gears of the same size and speed reducing mechanism between said differential and said bevel gears, and between said bevel gears and the driven axle sections.

6. The combination in a driving axle of a housing, a pair of driven axle sections arranged therein, a driving shaft section disposed in said housing, a differential mechanism out of alinement with and rearwardly of said driven axle sections and actuated by said driving shaft section, a fixed supporting member terminating in ends offset with respect to the central vertical plane through said driven axle sections, gears mounted to freely rotate thereon and speed reduction gearing between said differential and said gears and between said gears and said driven axle sections, whereby said reduction gearing has a relatively small width and height.

7. The combination with a pair of driven axle sections of a driving shaft section, a differential mechanism actuated thereby and disposed rearwardly of said driven axle sections, a shaft driven by one side of said differential and carrying a fixed pinion, a pinion and gear mounted to rotate together upon said shaft, said gear being driven by the other side of the differential, a supporting member carrying said rotatable shaft and mounted at an angle thereto, bevel gears rotatable upon the opposite ends of said supporting member, said gears being driven by pinions on the driven shaft and pinions mounted to turn with said bevel gears to drive the axle sections.

8. The combination in a driving axle of a housing, a pair of driven axle sections arranged end to end therein, a driving shaft disposed in said housing and carrying a differential disposed rearwardly of the housing for said driven axle sections, a cover plate removably secured to said housing and enclosing said differential mechanism, and speed reduction gearing disposed beneath and forwardly of said differential mechanism to drive said axle sections.

9. The combination in a driving axle of a housing, a pair of driven axle sections arranged therein, a driving shaft section disposed in said housing at an angle thereto, a differential mechanism mounted on said driving shaft and rearwardly of said driven axle sections, a driven shaft disposed beneath said driving shaft and carrying gears and pinions, said gears being driven by the differential mechanism and a cover plate removable from said housing enclosing said differential and gears driven thereby, whereby said differential and gears are readily accessible, and reduction gearing between said gears and driven axle sections.

10. In apparatus of the character described, the combination with a housing of a driving shaft and driven axle sections disposed therein, a differential mechanism mounted on said driving shaft, speed reducing gearing carried by a rotatable shaft and a fixed shaft interposed between said differential mechanism and the axle sections, said rotatable shaft and said fixed shaft being mounted at an angle to each other and in the walls of the housing, and closures on the housing to entirely enclose said fixed and rotatable shafts, whereby leakage of lubricant is prevented.

11. In an apparatus of the character described, the combination of a housing, a differential mechanism and power transmitting elements including a driving shaft and a driven shaft mounted in said housing, the front and rear walls of said housing being formed with alined bearing supports to receive bearings which support the opposite ends of said shafts, said rear wall of the housing being removably secured thereto, whereby said shaft, bearings, and power transmitting elements carried thereby, are accessible and whereby said driving shaft may be removed rearwardly from said housing.

12. In an apparatus of the character described the combination of a housing, a differential mechanism and power transmitting elements including a driving shaft and a driven shaft supported by bearings mounted in the front and rear walls of said housing, a part of the rear wall of said housing being removably secured to the body portion thereof, and a removable cover plate for the front part of said housing having an opening therethrough for the driving shaft whereby the driven shaft and the rear of said driving shaft are entirely enclosed by said housing but readily accessible upon the removal of said cover plate and rear wall.

13. In an apparatus of the character described the combination of a housing, fixed and driven shafts mounted in said housing at an angle to each other, power transmitting elements carried by said fixed and driven shafts, bearing supports carried by said housing to receive the bearings which support said shafts and the power transmitting elements, a driving shaft mounted in said housing and means forming part of the housing removably secured thereto whereby said driving shaft, fixed shaft, driven shaft and power transmitting elements are readily accessible in or removable from said housing, said removable means being imperforate except for an opening for the driving shaft.

14. In an apparatus of the character described the combination with a housing, of a driving shaft and driven axle sections disposed therein, power transmitting and speed reducing elements including a differential disposed in said housing, intermediate members forming a support for said power transmitting elements and forming with the housing an intermediate container to receive lubricant, part of said elements being disposed beneath said differential and dipping in said lubricant, whereby lubricant is carried to said differential.

15. A housing for a driving axle comprising a central body member enclosing driven axle sections, a driving shaft, a rotatable shaft and a fixed supporting member therefor mounted at an angle thereto in said housing, a differential mechanism mounted on the rear of said driving shaft, intermediate speed reducing gearing mounted on said fixed member and rotatable shaft, a cover plate removably secured to said housing to enclose said differential mechanism, and speed reducing gearing located directly beneath said differential, said removable cover plate and housing together forming a trough to hold lubricant substantially above the bottom of the housing, whereby said differential mechanism and speed reducing gearing located therebeneath may be lubricated by engagement of the gearing in said trough.

16. In an apparatus of the character described the combination with a housing of a driving shaft carrying a differential mechanism disposed therein, fixed and driven shafts mounted in said housing beneath said driving shaft and carrying power transmitting elements, said shafts being mounted in bearings supported in recesses in the exterior walls of said housing and by interior members, the top of said housing and the rear wall being removably secured whereby said fixed and driven shafts are easily accessible in and removable from said housing.

17. The combination in a driving axle, of driven axle sections, a driving shaft therefor having a differential mechanism mounted thereon, a fixed member having unalined ends, each of said ends being on one side of the central vertical plane through the axle sections, supports for said ends whereby said fixed shaft is prevented from turning about an axis parallel to the driven axle sections, said fixed member carrying a rotatable shaft having power transmitting elements driven by each side of the differential, bevel gears mounted on said unalined ends of said fixed members, said bevel gears being driven by the elements on said rotatable shaft, and pinions carried by said bevel gears to drive said driven axle sections.

18. The combination with a pair of driven axle sections of a driving shaft section, differential mechanism mounted on said driving shaft and operated thereby, spur pinions mounted on said driving shaft, each actuated by a bevel gear of the differential, spur gears and bevel pinions mounted on a rotatable shaft and driven by said spur pinions, bevel gears and spur pinions mounted to rotate on fixed shafts and driven by said bevel pinions, and spur gears mounted on the inner ends of said axle sections to drive the same, said gears being driven by said last named spur pinions.

In testimony whereof, I hereunto affix my signature.

LEO MELANOWSKI.